March 3, 1953 W. WRIGLEY 2,630,015
INCLINED GYRO-VERTICAL
Filed Aug. 17, 1946 3 Sheets-Sheet 1

INVENTOR
WALTER WRIGLEY
BY
Herbert V. Thompson
his ATTORNEY.

March 3, 1953  W. WRIGLEY  2,630,015
INCLINED GYRO-VERTICAL
Filed Aug. 17, 1946  3 Sheets-Sheet 2

INVENTOR
WALTER WRIGLEY
BY
Herbert A. Thompson
his ATTORNEY.

March 3, 1953 W. WRIGLEY 2,630,015
INCLINED GYRO-VERTICAL
Filed Aug. 17, 1946 3 Sheets-Sheet 3

INVENTOR
WALTER WRIGLEY
BY
Herbert N. Thompson
his ATTORNEY.

UNITED STATES PATENT OFFICE 2,630,015

INCLINED GYRO-VERTICAL

Walter Wrigley, Wollaston, Mass., assignor to The Sperry Corporation, a corporation of Delaware Application August 17, 1946, Serial No. 691,333

20 Claims. (Cl. 74—5.37)

This invention relates to gyro-verticals which are normally slightly forwardly inclined to avoid the errors otherwise appearing during and immediately following turns. It is now known, as described in copending application of Frederick D. Braddon, now Patent 2,409,659 reissued as Re. 23,291, dated November 7, 1950, that the errors of an ordinary aircraft gyro-vertical which is erected by torques brought into action by tilt and applied about a horizontal axis normal to the axis of tilt, may be mitigated by forwardly inclining the gyroscope at a predetermined small angle. Such correction, however, as heretofore proposed is only partial since, as recognized in the aforesaid application, the correction would be complete only if the turn takes place at the predetermined rate for which the instrument was designed, with an erection device of the substantially "off-on" type, that is, where the torque applied upon relative tilt of the pendulous controller and the gyroscope reaches a predetermined amount for a very small tilt and remains substantially constant for increased tilt, as contrasted with the type in which the torque applied is proportional to tilt.

According to the present invention, it is proposed to render the correction substantially complete for all rates of turn normally encountered.

The basic law governing the removal of the turn error in this type of gyro-vertical may be simply stated as follows:

$$\alpha \doteq \frac{K}{\omega M R}$$

or $$K \doteq \alpha \omega M R$$

where $\alpha$ = the angle of inclination of the gyro
$K$ = the erecting torque
$\omega$ = the rate of spin of the gyro rotor
$M$ = the moment of inertia of the rotor, and
$R$ = the rate of turn of the ship.

One method of accomplishing the above result is to design the gyroscope with an inclination such that the turn error is completely cured for some predetermined rate of turn, say a procedure turn, which is usually taken at 180 degrees a minute, or preferably for a slower rate below which the error is negligible. In the first instance for rates of turn greater or less than the above rate, either ($\alpha$) may be varied up or down inversely with the rate of turn of the craft, or ($K$) with the rate of turn of the craft, or ($\omega$) inversely with the rate of turn of the craft, but it is preferred to vary ($K$), for the reasons pointed out hereinafter.

In my British provisional specification No. 7914 for Improvements in or Relating to Gyro-Verticals, filed March 13, 1946, I describe a complete, though complicated, system of deriving signals from a plurality of rate of turn gyroscopes which signals assume a mean or predetermined value for a procedure turn and increase and decrease directly or inversely with increases or decreases in the rate of turn, as the case may be, for varying ($K$), ($\alpha$) or ($\omega$). Such structure, however, may be greatly simplified so that only one rate of turn gyroscope need be employed by assuming the normal ($\alpha$) or ($\omega$) or ($K$) for straight line flight and for some low rate of turn between straight line flight and a rate of turn (at the air speed prevalent) which causes a bank angle (or pendulum tilt) up to but not exceeding a predetermined small angle, such as 2°. Below this angle, most existing erection devices, such as the air jet type of erector shown in the aforesaid Braddon patent and in Fig. 5 of this application, give an erection rate substantially proportional to tilt or deflection of the pendulum, while above such angle the erection rate remains constant.

Referring now to the drawings showing several forms of my invention,

Figure 1:
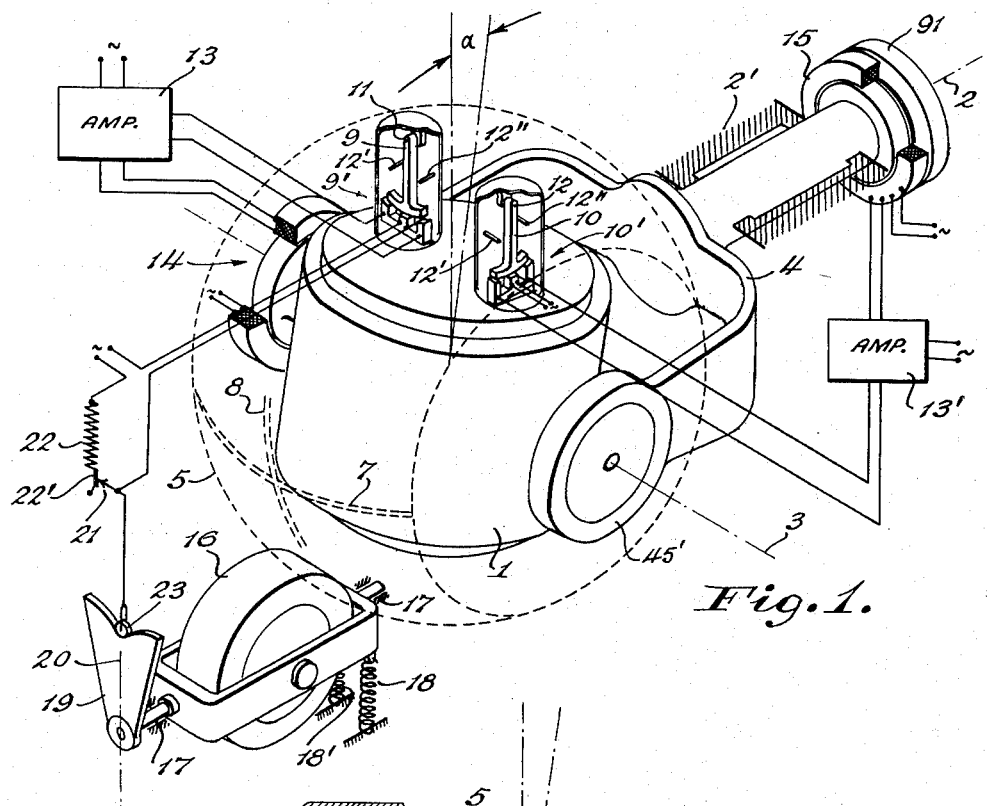
Fig. 1 is a diagrammatic perspective view of my improved inclined gyro-vertical in which K or the erection rate is varied with the rate of turn.

The gyroscopic structure in all figures is shown as enclosed in a casing 1 mounted for freedom on the craft about a fore-and-aft trunnion axis 2 and a lateral trunnion axis 3. While the gyroscopic structure usually preferably comprises but a single gyroscope with its spin axis at a small angle ($a$) to the vertical; such structure may, of course, comprise a plurality of gyroscopes as both types of gyro-verticals are well known. (See Patent No. 1,236,993 to Sperry and Tanner.) The gimbal ring 4 is journalled in a long bearing 2' on said fore-and-aft axis and is open at the front or U-shaped to furnish an unobstructed view of the indicating portion of the instrument, which may be in the form of a spherical shell 5 (see also Fig. 2) enclosing the gyro casing on which suitable pitch and roll indicating lines 7 and 8 are placed. The gravitational control is shown as furnished by a pair of pendulums 9 and 10 pivoted respectively about fore-and-aft and transverse horizontal axes 11 and 12, each pendulum controlling a signal means responsive to relative inclination of the pendulum and gyroscope about its pivotal axis. Electrical pick-off or signal generating means 9', 10' is shown in this figure for each pendulum. Stops 12' and 12" are placed on each side of each pendulum so as to limit their movement to a small angle, such as 2°, beyond which the signal remains substantially constant regardless of the lateral acceleration force. Hence, during rates of turn of appreciable magnitude, the signal will be substantially of off-on characteristic, but for ordinary small gyro tilts or very slow rates of turn the signal is proportional to the tilt and hence is independent of the rate of turn. The pick-off means 9', 10' as shown, is of the E-type in which single phase alternating current is supplied to a winding on the central leg and the secondary windings on each outer leg furnish a signal reversible in phase with the direction of tilt. Each signal is passed through a phase sensitive amplifier 13, 13' in the usual manner and controls a torque motor 14 or 15, or torquer, acting about the axis of the gyro at right angles to the axis of each pendulum, the pendulum 9 controlling the torque motor 14 and the pendulum 10 the torque motor 15. Both torquers may be of the two-phase type.

Figure 2:
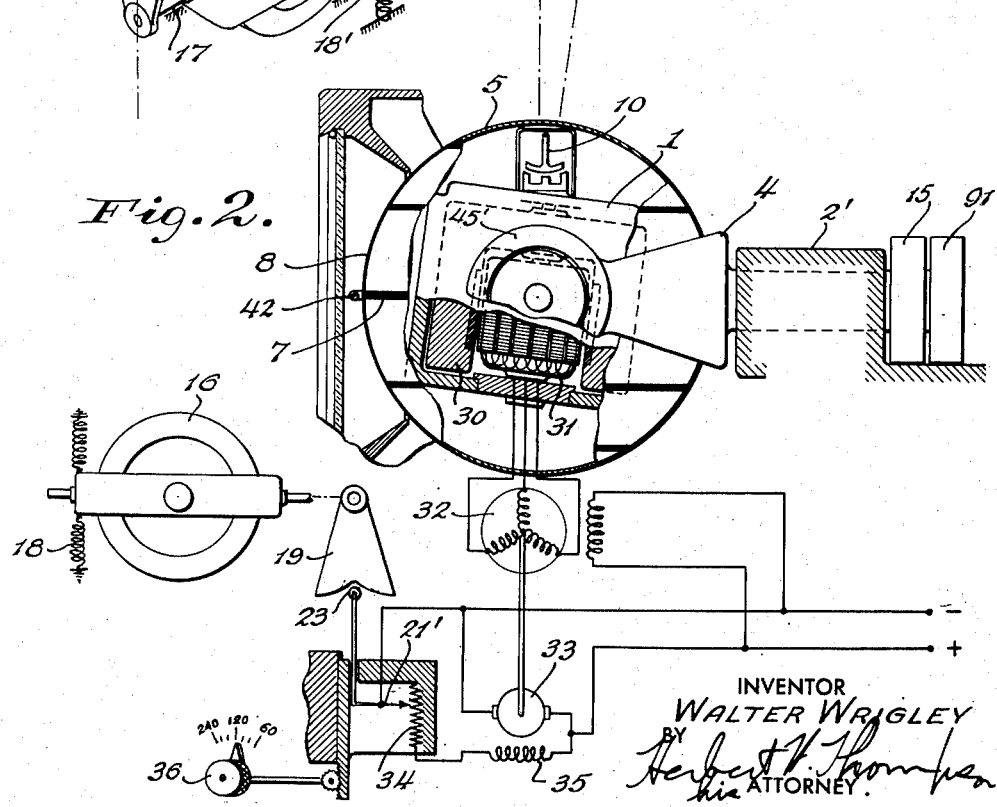
Fig. 2 is a side view partly in section of a modified form of a gyro-vertical in which the rotor speed or $\omega$ is varied inversely with the rate of turn.

It is between the pendulum 9 and the torque motor 14 that I place my improved means for taking care of different rates of turn. For this purpose, I have shown an ordinary rate of turn gyroscope 16 mounted on a fore-and-aft trunnion axis 17 for precession upon turn of the craft against centralizing springs 18, 18'. On the trunnion 17, I have shown a cam 19 preferably symmetrically shaped about central reference 20 and controlling a follower 23 and slider 21 of potentiometer 22 which is in series with the A. C. input to the signal generator 9'. During straight flight and for slow rates of turn, such as would not tend to cause deflection of the pendulum beyond the stops 12', 12", I employ a standard erection torque, such as would give the desired normal rate of erection of the gyro-vertical to correct tilts and also having reference to the forward angle of inclination ($a$) selected. Therefore, the resistance 22 has a short portion 22' which has a linear output, that is, the output remains constant representing rates of turn at cruising speed giving a bank angle of 2° or less. Beyond this limit, however, the slider 21 moves off the linear portion 22' of the resistance 22 for precession of the rate gyro 16 in either direction to reduce the resistance 22 normally in series with the supply and thereby increasing the rate of erection with the rate of turn, up to some predetermined maximum. As shown in Fig. 2 the same result could be obtained by lifting the roller 23 a short distance off the cam 19. Then the cam 19 would not alter the resistance until it had been moved through more than the 2° limit in either direction.

Alternatively, I may vary the speed of the rotor ($\omega$) inversely with the rate of turn ($R$). Such a modification is illustrated in Fig. 2. In this case, the gyro rotor 30 is shown as integral with the rotor of a squirrel cage motor, the stator 31 being supplied from a three-phase alternating current generator 32, driven by a direct current motor 33. The motor 33 is normally driven at a predetermined high speed, which is reduced inversely with the rate of turn up to a limiting factor. For this purpose, I have shown a potentiometer 34 controlling the excitation of the shunt field 35 of motor 33. The slider 21' of the potentiometer is positioned by a cam 19 on the rate of turn gyroscope 16 as before. In the central position, that is, at zero rate of turn and very slow rates of turn, the motor generator and hence the gyro rotor are driven at maximum speed and for greater rates of turn in either direction the slider 21' cuts out greater portions of resistance 34 to increase the field strength of the motor 33 and thereby reduce the speed of the rotor.

A further refinement may be provided by adjusting the rheostat with reference to air speed, since it is obvious that the bank angle (which is normally the same as the natural angle of deflection of the pendulous controller 9) is not only varied with the rate of turn, but also with air speed. In other words, a high rate of speed such as at 240 miles per hour, should bring the rheostat into operation at a much lower rate of turn than a low air speed, such as 60 miles per hour. For this purpose, a knob 36 is provided, preferably graduated in air speed, for adjusting the position of the rheostat 34 with reference to the slider 21', so that the resistance is introduced at lower rates of turn for high air speed. The utility of this adjustment is also indicated by the fact that the output signal of the pick-offs is proportional to tilt below the 2° limit.

Figure 3:
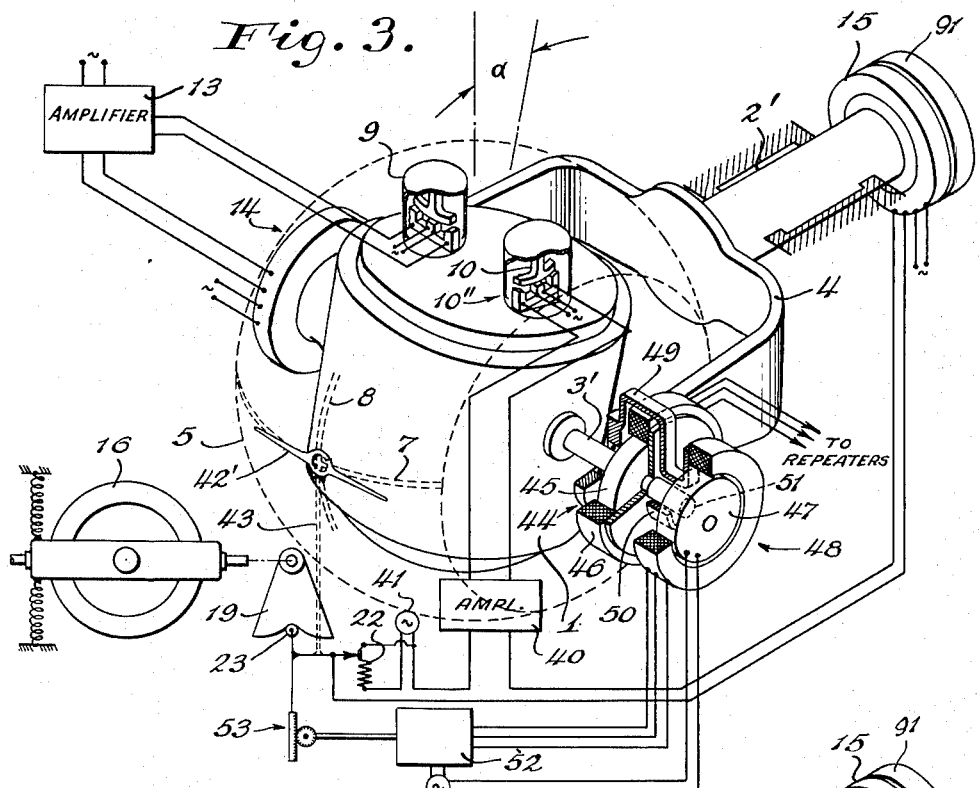
Fig. 3 is a diagrammatic perspective view partly in section of a third modification, showing a gyro-vertical in which the inclination $\alpha$ is varied inversely with the rate of turn.

The third alternative, that is, of varying the gyro inclination ($a$) inversely with the rate of turn, is illustrated diagrammatically in Fig. 3, in which the parts are correspondingly numbered with those of Fig. 1. In order to secure variations in the angle of inclination between the gyroscope and the pitch pendulum 10, instead of physically altering the angular relation between the pendulum and gyroscope, as shown in Fig. 1 of the copending application of John M. Slater, filed June 29, 1946, for Acceleration Correction for Gyro-Verticals, I have acomplished this purpose in an alternative or equivalent manner as follows:

The signal from the E-pick-off 10" of the pendulum 10 is modified by a signal from a rate of turn gyroscope 16 before being applied to the torquer 15. As shown, the said signal is first fed to the amplifier 40 and then combined with a single phase source of supply 41, properly phased with respect to the output of amplifier 40, in circuit with the potentiometer 22, the slider of the potentiometer being controlled from the cam 19 as in the previously described forms of the invention. The signal from pick-off 10" is therefore combined with a separate signal controlled by potentiometer 22 which is proportional to the rate of turn and bucks or opposes the signal from pick-off 10″, thus shifting the point of zero resultant signal and therefore reducing the normal tilt angle (a) inversely with the rate of turn within the limits previously specified.

Since the changing tilt angle would also change the reading of the gyro-vertical without some correction device, I have shown a simple means for making such correction, consisting in adjustably mounting the pitch index 42′, mounted in front of the sphere 5 bearing the pitch and roll indications 7 and 8 (see Fig. 2) in accordance with the rate of turn. This may be conveniently accomplished by connecting the follower 23 on cam 19 to the index 42′ by suitable linkage 43 to move the index as the follower is moved from the cam 19.

If the gyro-vertical is used to control an automatic pilot or transmit its indications to repeaters, the transmitted vertical should also be likewise corrected. This is shown as accomplished by introducing a correction in the transmitter 44 which transmits the pitch indications of the gyro-vertical to a remote device, the roll transmitter being shown in all figures at 91. Said transmitter is shown as having its rotor 45 directly connected to trunnion 3′ of the gyro-vertical and its stator 46 adjustably mounted with respect thereto by being connected to the rotor 47 of a repeater motor 48 in line with the trunnion 3′. The field of said repeater motor is shown as fixed to the gimbal 4 by means of U-shaped brackets 49 secured at their inner end to the gimbal and at their outer end to the field structure of the repeater motor, said brackets also furnishing the bearings 50 for the shaft 51 of the repeater motor. Said repeater motor, in turn, is controlled by a transmitter 52 which is rotated from the movements of the follower 23 on cam 19 as by means of a rack and pinion 53. Hence, the pitch angles transmitted by the transmitter 44 will be corrected for varying rates of turn just as are the visual indications so corrected by the shifting of the reference index 42′.

Hence, the normal angle of inclination (a) is decreased with the rate of turn because with increased rates of turn, the point of zero torque of motor 15 is shifted toward the vertical.

Figure 4:
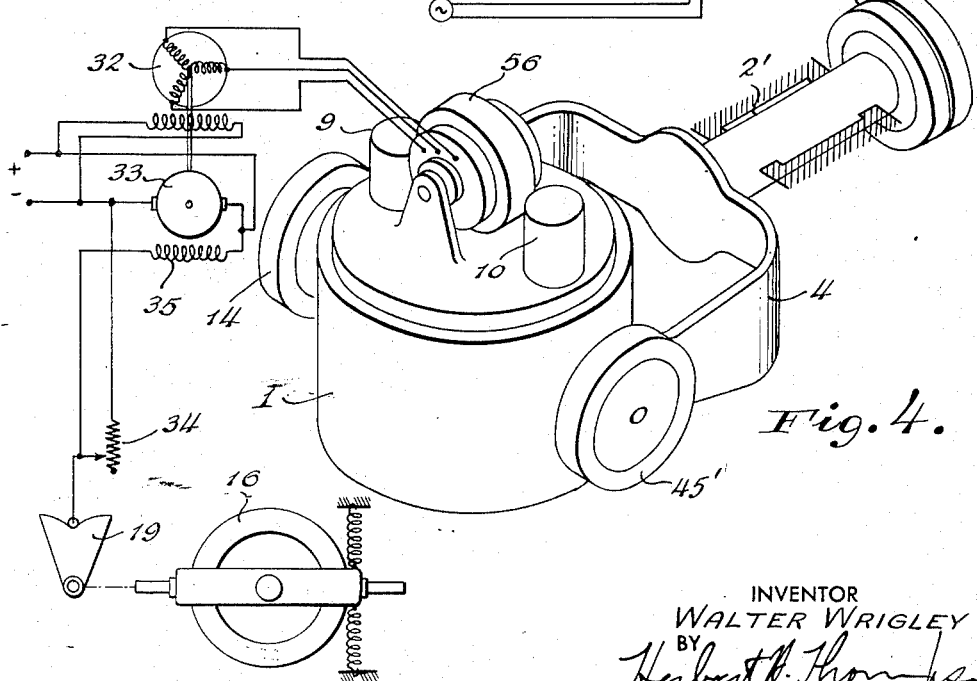
Fig. 4 is a similar perspective view of another modification in which instead of inclining the main gyroscope, a fixed auxiliary gyroscope or rotor spinning at an angle (preferably 90°) to the main gyroscope is employed, in which the speed of the auxiliary rotor is varied inversely with the rate of turn.

Fig. 4 employs two gyroscopes, a main gyro-vertical 1 and a rotor 56 mounted crosswise on the same. In this form, although the rotor speed of the auxiliary rotor is varied, the over-all effect is to vectorially vary the inclination of the gyro unit as a whole, since obviously an increase in the rotor speed of the auxiliary gyro 56 increases in effect the inclination of the gyro unit and vice versa. The rotor speed of the auxiliary rotor may be controlled by a rate gyro 16 as in Fig. 2, so that the description need not be repeated.

Of the various forms described above, I prefer the form in which K, the erection rate, is varied, such as shown in Fig. 1 because this factor may be varied without disturbing the gyroscope, while a forced change of either (a) or (ω) would give rise to an oscillation being set up.

Figure 5:
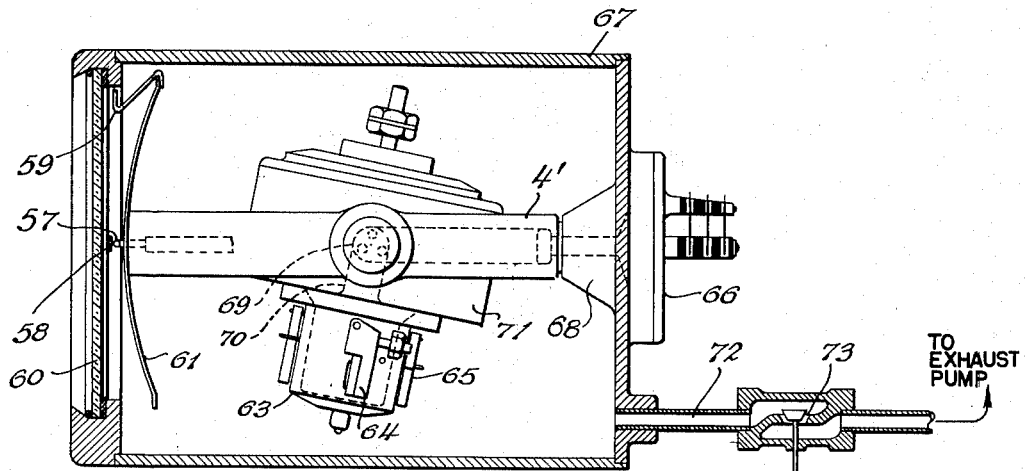
Fig. 5 is a side elevation of an air erected gyroscope of conventional form, showing my invention applied thereto, the outer housing being in section.

A further modification is shown in Fig. 5 which illustrates how the erection torque may be varied in air-erected types of gyroscopes of the conventional type shown in the aforesaid Braddon application.

Figure 6:
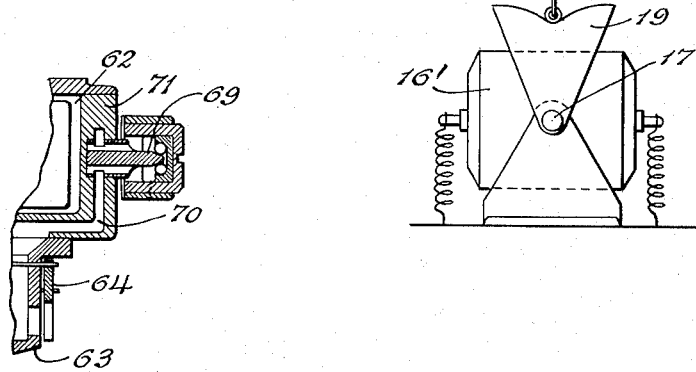
Fig. 6 is a sectional detail of Fig. 5 through the transverse trunnion between the gimbal and rotor case.

A conventional artificial horizon indicator is shown in the form of a horizon bar 57 which is stabilized against both rolling and pitching by the gyroscope and is readable upon a pitch index 58 and a roll index 59 on the face 60 of the instrument and on the background shield 61 secured to the gimbal ring 4′. However, in this system, I prefer to drive the rotor electrically, as indicated in the drawing, rather than by air, in order to avoid change of rotor speed with changes of the erection rate. Hence, the interior of the rotor casing 62 (Fig. 6) is sealed off from the lower extension 63 which supoprts the pairs of pendulous shutters 64 and 65. Air is admitted to this extension through the screened opening 66 in the rear of the outer casing 67, passing through hollow gimbal trunnion 68 and hollow gyro casing trunnion 69 within a channel 70 in the rotor casing 71, whence it is lead into the interior of the extension 63 (see Fig. 6). Air is continuously withdrawn from the interior of the housing 67 through pipe 72 connected to an exhaust pump or Venturi tube (not shown), and the rate of withdrawal is increased with increasing rates of turns, by suitable means, such as by progressively opening a throttle valve 73 located in the exhaust pipe and controlled by cam 19 on the trunnion 17 of the rate gyro 16′.

As before, during straight line flight and for turns up to a certain predetermined low limit, the erection rate remains normal, but for turns above this rate in either direction the throttle valve is lifted with increase in the rate of turn to increase the erection rate proportionally.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyro-vertical for navigable craft in which the gyro unit is forwardly inclined for eliminating turn errors at a predetermined rate of turn, said unit having normal gyroscopic factors, including a normal rotor speed, a normal rate of erection, and a normal forward inclination, a second gyroscope of the rate of turn type, and means actuated thereby for altering the relation between factors of the gyro-vertical, such as the rotor speed, rate of erection and inclination, when the craft is turning at a rate different from said predetermined rate of turn.

2. A gyro-vertical for navigable craft in which the gyro unit is forwardly inclined for eliminating turn errors at a predetermined slow rate of turn, said unit having normal gyroscopic factors, including a normal rotor speed, a normal rate of erection, and a normal forward inclination, a second gyroscope of the rate of turn type, and means actuated thereby for altering the relation between factors of the gyro-vertical, such as the rotor speed, rate of erection and inclination, when the craft is turning at a rate greater than said predetermined rate.

3. A gyro-vertical as claimed in claim 2, in which the rate of erection of the gyroscope is increased as the rate of turn increases.

4. A gyro-vertical for dirigible craft in which the normal operating position of the gyro unit is forwardly inclined, a gravitationally controlled power erection device therefor of substantially the off-on type, and means for altering the angular relation between said erection device and said unit during and in accordance with the rate of turn to alter the inclination of the unit for different rates of turn.

5. A gyro-vertical for moving craft as claimed in claim 4, having means for preventing the 6. In a gyro-vertical for dirigible craft in which the normal operating position of the gyro unit is forwardly inclined, a gravitationally controlled power erection device therefor including a transversely pivoted pendulum with signal means controlled thereby, a torquer controlled by said signal means for applying a torque about the fore-and-aft axis to correct pitch errors, and means responsive to the rate of turn of the craft for supplying a second signal to said torquer to alter the null position of the gravitational device, whereby the forward inclination of the gyroscope is varied inversely with the rate of turn.

7. In a gyro-vertical, a primary universally mounted gyro unit, power erected gravitationally controlled means for maintaining the same erect, an auxiliary rotor mounted on said unit for preventing turn errors and having its spin axis fore-and-aft and means for varying the speed of rotation of said auxiliary rotor inversely with the rate of turn of the craft.

8. A gyro-vertical for moving craft in which the normal operating position of the gyro unit is forwardly inclined, a gravitationally controlled power erection device therefor of the type giving an erection torque proportional to normal bank through a predetermined small angle but otherwise remaining constant for all greater bank angles, a second gyroscope of the rate of turn type and means actuated thereby for altering the relation between such otherwise constant erection rate, the rotor speed, and the gyro inclination when the craft is turning at a rate beyond that giving rise to such predetermined small bank angle.

9. Means for avoiding deviations of the readings of a gyro-vertical for moving craft, regardless of the rate of turn during turns, the combination with a gyro-vertical having an erection device of substantially off-on characteristics, an auxiliary rotor also mounted thereon having a normally horizontal spin axis, and means for varying the speed of rotation of the auxiliary rotor inversely with the rate of turn of the craft.

10. A gyro-vertical for dirigible craft in which the normal operating position of the gyro unit is forwardly inclined, a gravitationally controlled power erection device therefor of substantially the off-on type, means for altering the angular relation between said erection device and gyroscope during and in accordance with the rate of turn to alter the inclination of the gyroscope for different rates of turn, a horizon indicator associated with said gyro-vertical including a normally fixed index, and means for displacing said index in accordance with the rate of turn, whereby the indicator shows the true horizontal regardless of changes of inclination of the gyro for different rates of turn.

11. A gyro-vertical for dirigible craft in which the normal operating position of the gyro unit is forwardly inclined, a gravitationally controlled power erection device therefor of substantially the off-on type, means for altering the angular relation between said erection device and gyroscope during and in accordance with the rate of turn to alter the inclination of the gyroscope for different rates of turn, means actuated by said gyro-vertical for transmitting the indication thereof to a distance, and means for correcting the transmitted indications with changes in rate of turn whereby the true vertical is transmitted.

12. A gyro-vertical for dirigible craft in which the normal operating position of the gyro unit is forwardly inclined, a gravitationally controlled erection device therefor adapted to exert a torque on the gyro upon tilt of the gyro away from such operating position, said torque being about a substantially horizontal axis normal to the axis of tilt, means for measuring the rate of turn of said craft, and means responsive thereto for varying said torque as a direct function of such rate of turn.

13. In combination, a universally pivoted gyroscope adapted to be mounted on a moving vehicle, said gyroscope having a spin axis that is normally tipped from the vertical a small amount in the direction of motion of said vehicle, an erection system comprising a gravitational element for detecting changes in the forward inclination of said spin axis, an electrical torquer brought into action by said element to exert a torque of the gyro about a fore-and-aft axis, and means for varying the strength of the current torquing the gyro as the rate of turn of the craft increases, to provide proper turn error compensation at variable rates of turn.

14. A gyro-vertical for dirigible craft in which the normal operating position of the gyro unit is forwardly inclined, a gravitationally controlled power erection device therefor of substantially the off-on type, and means for additionally altering the strength of such erection device during and in accordance with the rate of turn of the craft, whereby the rate of erection is increased as the rate of turn increases.

15. A gyro-vertical system for mobile craft, having a gravity controlled erection device providing a torque independent of the amount of tilt between the system and said gravity device after a predetermined small tilt is exceeded, and in which the axis of total angular momentum of the system is directed at a small angle to the vertical to eliminate turn errors, characterized in that adjusting means are provided by which the relationship between the horizontal component of the total angular momentum of the system and the aforesaid torque exerted by the erection device is adjustable while the gyro-vertical is in operation, and means responsive to the rate of turn of the craft for adjusting such adjustable means.

16. A gyro-vertical as claimed in claim 15 in which the adjustment between the horizontal component of the total angular momentum of the system and the gravity controlled erection torque is effected by varying the torque exerted by the gravity device directly with the rate of turn of the craft.

17. A gyro-vertical as claimed in claim 15 in which the adjustment between the horizontal component of the total angular momentum of the system and the gravity controlled erection device is effected by altering the normal inclination of the gyro-vertical spin axis inversely with the rate of turn of the craft.

18. A gyro-vertical as claimed in claim 15 in which the adjustment between the horizontal component of the total angular momentum of the system and the gravity controlled erection device is effected by varying the speed of the gyro-rotor inversely with the rate of turn of the craft.

19. A gyro-vertical as claimed in claim 15 in which the gyroscopic system comprises two gyroscopes, one with a normally vertical spin axis and the other with its spin axis fore-and-aft on the craft, and the adjustment between the horizontal component of the total angular momentum of the system and the gravity controlled erection torque is effected by varying the speed of the second gyroscope inversely with the rate of turn of the craft.

20. In a gyro-vertical of the air erected gravitationally controlled type, in which the gyro is forwardly inclined for reducing turn errors, a housing enclosing the same, opposing air ports on said gyro supplied with air at atmospheric pressure, means for creating and maintaining air pressure in said housing different from that of the atmosphere to cause discharge of air from said ports for erecting the gyroscope, gravitationally responsive means for differentially controlling the discharge of said air, and means for varying the pressure in said housing in accordance with the rate of turn of the craft.

WALTER WRIGLEY.

REFERENCES CITED

The following references are of record in the file of this patent:

UNITED STATES PATENTS

| Number | Name | Date |
|---|---|---|
| 1,442,799 | Gray | Jan. 23, 1933 |
| 1,932,210 | Glitscher | Oct. 24, 1933 |
| 1,942,470 | Bassett | Jan. 9, 1934 |
| 2,242,806 | Wunsch | May 20, 1941 |
| 2,303,799 | Summers | Dec. 1, 1942 |
| 2,315,500 | Carter | Apr. 6, 1943 |
| 2,409,659 | Braddon | Oct. 22, 1946 |
| 2,412,614 | Haskins, Jr. et al. | Dec. 17, 1946 |
| 2,417,573 | Strother | Mar. 18, 1947 |
| 2,420,674 | Moore et al. | May 20, 1947 |
| 2,501,885 | Barnes et al. | Mar. 28, 1950 |

FOREIGN PATENTS

| Number | Country | Date |
|---|---|---|
| 619,960 | Great Britain | Mar. 17, 1949 |